United States Patent
Gines et al.

(10) Patent No.: US 9,673,862 B1
(45) Date of Patent: Jun. 6, 2017

(54) SYSTEM AND METHOD OF ANALYZING CROSSTALK WITHOUT MEASURING AGGRESSOR SIGNAL

(71) Applicant: Keysight Technologies, Inc., Minneapolis, MN (US)

(72) Inventors: David L. Gines, Fort Collins, CO (US); Steven Draving, Colorado Springs, CO (US); Min Jie Chong, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/183,772

(22) Filed: Jun. 15, 2016

(51) Int. Cl.
*H04B 3/487* (2015.01)
*H04B 3/32* (2006.01)
*H04M 3/34* (2006.01)

(52) U.S. Cl.
CPC ............ *H04B 3/487* (2015.01); *H04B 3/32* (2013.01); *H04M 3/34* (2013.01)

(58) Field of Classification Search
CPC ........ H04B 3/32; H04B 3/487; H04B 1/1027; H04M 3/34; H04M 1/0202; G11C 29/06; G11C 29/56
See application file for complete search history.

(56) References Cited

U.S. PATENT DOCUMENTS

| | | | | |
|---|---|---|---|---|
| 6,128,769 A * | 10/2000 | Carlson | ............... | G06F 17/5022 703/19 |
| 2005/0030884 A1 * | 2/2005 | Kim | ................... | H04B 3/23 370/201 |
| 2005/0053229 A1 * | 3/2005 | Tsatsanis | ................. | H04B 3/32 379/406.01 |
| 2005/0163207 A1 * | 7/2005 | Buckwalter | ....... | H04L 25/03878 375/229 |
| 2008/0024331 A1 | 1/2008 | Jang | | |
| 2011/0235759 A1 * | 9/2011 | Pierrugues | ............... | H04B 3/32 375/346 |
| 2015/0162952 A1 * | 6/2015 | Hollis | ................... | H04B 3/487 370/201 |
| 2016/0277068 A1 | 9/2016 | Heinikoski et al. | | |

OTHER PUBLICATIONS

Office Action dated Jan. 10, 2017 for U.S. Appl. No. 15/169,189.
Co-pending U.S. Appl. No. 15/159,786, filed May 19, 2016.
Co-pending U.S. Appl. No. 15/169,189, filed May 31, 2016.

* cited by examiner

*Primary Examiner* — Syed Haider

(57) ABSTRACT

A measurement instrument and associated method: receive at a measurement instrument at least one victim signal from a device under test (DUT), the victim signal including crosstalk interference from one or more aggressor signals which are not received by the measurement instrument; extract from the victim signal an ideal data pattern for the received victim signal, where the ideal data pattern does not include intersymbol interference (ISI), a noise component, or crosstalk interference to the victim signal; ascertain from the received victim signal and the ideal data pattern the ISI for the victim signal; produce a difference signal as a difference between: (1) the received victim signal; and (2) a sum of the ideal data pattern and the ISI; and ascertain from the difference signal a sum of the noise component and the crosstalk interference from one or more aggressor signals which are not received by the measurement instrument.

20 Claims, 8 Drawing Sheets

SYSTEM AND METHOD OF ANALYZING CROSSTALK WITHOUT MEASURING AGGRESSOR SIGNAL

BACKGROUND

In many systems and devices, especially, for example, devices and systems which include high speed digital communication circuits, intersymbol interference and crosstalk interference between various electrical signals can be significant problems—and difficult ones to understand and diagnose.

Commonly, crosstalk interference may be produced by two signal lines coupling energy onto each other (e.g., two parallel lines radiating their signals onto each other). In general, herein, we refer to the signal which generates the crosstalk interference as an "interfering signal" or "aggressor signal," and the signal which experiences the crosstalk interference as a "victim signal." Of course when two signals produce mutual crosstalk interference, each signal may be both an aggressor signal in one case, and a victim signal in the other case.

Intersymbol interference (ISI), on the other hand, is caused by "aggressor bits" distorting other "victim bits" within the same serial data signal.

The ability to measure the magnitude of ISI and crosstalk for a particular serial data signal can be helpful to diagnosing and minimizing the crosstalk.

The analysis and diagnosis of crosstalk in a given device may be difficult and complicated.

For example, circuit simulation may be employed to analyze and diagnose crosstalk between two or more signal lines of a particular device. Given a circuit model of the particular device, software simulation tools may be employed to estimate the amount of crosstalk for a given signal line.

However, such circuit simulation has drawbacks. For one thing, the simulation results will only be as good as the circuit model. Producing accurate circuit models can be difficult and time-consuming as many circuits are complicated and have a large number of components. And if an accurate circuit model is produced, every time that a change is made to the device which is being analyzed, the circuit model must be updated. Furthermore, running the simulations can also require a lot of effort and can be time consuming. Moreover, it can be very difficult to produce an accurate simulation since in many cases the crosstalk may be created or affected by non-linearities and parasitic impedances in the circuit, which—unlike nominal circuit values—are typically not known in advance and may be difficult to ascertain. Because of this, crosstalk performance may vary significantly from individual device to individual device even when the devices are designed to be identical. Furthermore, in some cases (e.g., voltage-dependent power supply crosstalk) the model must be non-linear (voltage dependent) to accurately reflect the underlying crosstalk mechanisms. So, the accuracy of crosstalk estimates produced from circuit modeling and simulation is an issue.

One improvement for analyzing and diagnosing crosstalk for a device is to use actual measurements of a sample of the device to construct a circuit model, rather than constructing the circuit model from circuit diagrams or schematics. For example, to construct a circuit model for crosstalk produced by a supply voltage aggressor, one may disconnect the power supply from the rest of the device under test and replace it with an external supply which can be controlled to artificially generate a range of disturbance(s), and then measure the corresponding effect on the signal line(s) of interest as a function of the disturbance(s) across an expected range of interest. While this approach may potentially yield more accurate results, it can be tedious, invasive, time consuming, and require a lot of very expensive equipment.

As indicated above, in addition to crosstalk between signals (e.g., serial data signals) in a given device, power supplies can also create crosstalk interference to signals. In many cases, power supply crosstalk interference onto a victim signal can be just as important or more important to understand and diagnose as crosstalk interference between two signal lines. One reason for this is that different mechanisms and affects may pertain to power supply crosstalk as compared to crosstalk interference between two signal lines. For example, the amplitude noise that a supply voltage may add to a victim signal may be non-linear or voltage dependent. In particular, a positive supply voltage may be connected directly to the transmission line for a victim signal when the signal's level is at a "high value" (e.g., logic 1), so noise or voltage drift in the supply voltage may transfer directly to the victim signal. However the same interference may occur at a significantly reduced level when the victim signal's level is at a "low value" (e.g., logic 0). The opposite may be the case for negative supply voltages and ground, which may have more of an impact on a victim signal when the signal's level is low than when it is high.

Accordingly, the analysis and diagnosis of voltage-dependent power supply crosstalk in a given device may be particularly difficult and complicated.

It would be desirable to provide an additional technique for analyzing and diagnosing crosstalk for a victim signal of a device under test.

SUMMARY

Techniques have been developed for analyzing and diagnosing crosstalk from an aggressor signal onto a victim signal without employing circuit simulation or elaborate circuit-based models. Such techniques are disclosed in U.S. patent application Ser. No. 15/159,786 filed on 19 May 2016 ("the '786 Application"), and in U.S. patent application Ser. No. 15/169,189, filed on 31 May 2016, entitled "SYSTEM AND METHOD OF ANALYZING CROSSTALK AND INTERSYMBOL INTERFERENCE FOR SERIAL DATA SIGNALS" ("the '189 Application"), the disclosures of both of which patent applications are incorporated herein by reference as if fully set forth herein.

The techniques disclosed in these references involve measuring both the victim signal(s) and the aggressor signal(s). However in some cases it may not be possible to measure one of more aggressor signal(s)—for example aggressor signal(s) which may be internal to a chip or integrated circuit of a DUT, or in some other inaccessible location.

Accordingly, it would also be desirable to provide a technique for analyzing and diagnosing crosstalk for a victim signal (e.g., a serial data signal) of a device under test from an aggressor signal without actually probing or measuring the aggressor signal.

A method comprises: a measurement instrument receiving at one or more inputs thereof at least one victim signal from a device under test (DUT), the victim signal including crosstalk interference from one or more aggressor signals which are not received by the measurement instrument; extracting from the victim signal an ideal data pattern for the received victim signal, where the ideal data pattern does not include intersymbol interference (ISI), does not include a noise component, and does not include crosstalk interference to the victim signal; ascertaining from the received victim signal and the ideal data pattern at least the ISI for the victim signal; producing a difference signal as a difference between: (1) the received victim signal; and (2) a sum of the ideal data pattern and the ISI; and ascertaining from the difference signal a residual component of the received victim signal comprising a sum of the noise component and the crosstalk interference from the one or more aggressor signals which are not received by the measurement instrument.

In some embodiments, the victim signal further includes crosstalk interference from one or more additional aggressor signals which are received by the measurement instrument, and the method further includes: ascertaining the crosstalk interference to the victim signal from the one or more additional aggressor signals which are received by the measurement instrument; and subtracting from the difference signal the ascertained crosstalk interference to the victim signal from the one or more additional aggressor signals which are received by the measurement instrument to ascertain the residual component of the received victim signal.

In some versions of these embodiments, the method further comprises estimating the crosstalk interference from the one or more aggressor signals which are not received by the measurement instrument, from the residual component of the received victim signal.

In some versions of these embodiments, estimating the crosstalk interference from the one or more aggressor signals which are not received by the measurement instrument, from the residual component of the received victim signal, comprises: performing a Fourier transform on the residual component of the received victim signal to produce a frequency spectrum comprising a plurality of frequency components of the residual component of the received victim signal; setting a threshold; eliminating from the frequency spectrum any frequency components of the residual component of the received victim signal having a magnitude less than the threshold, to produce a modified frequency spectrum; and performing an inverse Fourier transform on the modified frequency spectrum to produce an estimate of the crosstalk interference from the one or more aggressor signals which are not received by the measurement instrument.

In some versions of these embodiments, the method further comprises: in response to a user selection, removing from the victim signal at least one of: (1) the ISI, (2) the ideal data pattern, (3) the estimated crosstalk interference from at least one of the one or more aggressor signals which are not received by the measurement instrument, (4) the estimated crosstalk interference from at least one of the one or more additional aggressor signals which are measured by the measurement instrument, and (5) the estimated crosstalk voltage interference from a sum of the noise component and the crosstalk interference from the one or more aggressor signals which are not received by the measurement instrument; and displaying on a display device the victim signal with the at least one of: (1) the ISI, (2) the ideal data pattern, and (3) the estimated crosstalk interference from at least one of the one or more aggressor signals which are not received by the measurement instrument, (4) the estimated crosstalk interference from at least one of the one or more additional aggressor signals which are measured by the measurement instrument, and (5) the estimated crosstalk interference from a sum of the noise component and the crosstalk interference from the one or more aggressor signals which are not received by the measurement instrument, removed.

In some versions of these embodiments, the method further comprises: in response to a user selection, removing from the victim signal at least one of: (1) the ISI, (2) the estimated crosstalk interference from at least one of the one or more additional aggressor signals which are measured by the measurement instrument, (3) the estimated crosstalk interference from at least one of the one or more aggressor signals which are not received by the measurement instrument, and (4) the estimated crosstalk interference from the one or more aggressor signals which are not received by the measurement instrument plus noise; and displaying on a display device an eye pattern for the victim signal with the at least one of: (1) the ISI, (2) the estimated crosstalk interference from at least one of the one or more additional aggressor signals which are measured by the measurement instrument, (3) the estimated crosstalk interference from at least one of the one or more aggressor signals which are not received by the measurement instrument, and (4) the estimated crosstalk interference from the one or more aggressor signals which are not received by the measurement instrument plus noise, removed.

In some versions of these embodiments, the method further comprises eliminating a skew between the captured samples of the victim signal and the captured samples of the additional aggressor signals before ascertaining the coefficients for the crosstalk interference filter function which transforms the received aggressor signal into the crosstalk signal, wherein the ascertained coefficients provide the crosstalk signal with a best-fit for the residual error signal.

In some embodiments, ascertaining from the received victim signal and the ideal data pattern at least the ISI for the victim signal comprises ascertaining coefficients for an ISI filter function which transforms the ideal data pattern for the received victim signal into a hypothetical victim signal where the hypothetical victim signal includes the ISI but no crosstalk interference thereto, wherein the ascertained coefficients provide the hypothetical victim signal with a best-fit for the received victim signal.

In some versions of these embodiments, the method further comprises further comprising capturing samples of the received victim signal, wherein ascertaining the coefficients of the ISI filter function includes: causing the victim signal to comprise a repeating data pattern such that the captured samples of the received victim signal include a plurality of instances of the data pattern; ascertaining, from the captured samples of the received victim signal for the plurality of instances of the data pattern, an average vector of captured data sample values over the plurality of instances of the data pattern for each of a plurality of bits in the data pattern; and ascertaining from the average vector and the bits in the data pattern the coefficients of the ISI filter function.

In some versions of these embodiments, ascertaining the coefficients of the ISI filter function includes solving a set of linear equations wherein in each equation a data set of the captured samples of the victim signal is set equal to a convolution of the ISI filter function and the ideal data pattern for the captured samples of the received victim signal.

In some embodiments, the at least one victim signal includes at least one of a serial data signal and a supply voltage, and the ISI of the supply voltage is set equal to zero.

In some embodiments, the crosstalk interference to the victim signal includes at least one of linear crosstalk, non-linear crosstalk, and jitter.

A measurement instrument comprises: one or more inputs configured to receive at least one victim signal from a device under test (DUT), the victim signal including crosstalk interference from one or more aggressor signals which are not received by the measurement instrument; a first sampler configured to capture samples of the received victim signal; and a signal processor. The signal processor is configured to: extract from the victim signal an ideal data pattern for the received victim signal, where the ideal data pattern does not include intersymbol interference (ISI), does not include the noise component, and does not include crosstalk interference to the victim signal; determine from the received victim signal and the ideal data pattern at least the ISI for the victim signal; produce a difference error signal as a difference between: (1) the received victim signal; and (2) a sum of the ideal data pattern and the ISI; and ascertain from the difference signal a residual component of the received victim signal comprising a sum of the noise component and the crosstalk interference from one or more aggressor signals which are not received by the measurement instrument.

In some embodiments, the victim signal further includes crosstalk interference from one or more additional aggressor signals which are received by the measurement instrument, and the signal processor is further configured to: ascertain the crosstalk interference to the victim signal from the one or more additional aggressor signals which are received by the measurement instrument; and subtract from the difference signal the ascertained crosstalk interference to the victim signal from the one or more additional aggressor signals which are received by the measurement instrument to ascertain the residual component of the received victim signal.

In some versions of these embodiments, the signal processor is further configured to estimate the crosstalk interference from the one or more aggressor signals which are not received by the measurement instrument from the residual component of the received victim signal.

In some versions of these embodiments, the signal processor is further configured to estimate the crosstalk interference from the one or more aggressor signals which are not received by the measurement instrument, from the residual component of the received victim signal, by: performing a Fourier transform on the residual component of the received victim signal to produce a frequency spectrum comprising a plurality of frequency components of the residual component of the received victim signal; setting a threshold; eliminating from the frequency spectrum any frequency components of the residual component of the received victim signal having a magnitude less than the threshold, to produce a modified frequency spectrum; and performing an inverse Fourier transform on the modified frequency spectrum to produce an estimate of the crosstalk interference from the one or more aggressor signals which are not received by the measurement instrument.

In some versions of these embodiments, the signal processor is further configured to: in response to a user selection, remove from the victim signal at least one of: (1) the ISI, (2) the ideal data pattern, (3) the estimated crosstalk interference from at least one of the one or more additional aggressor signals which are not received by the measurement instrument, (4) the estimated crosstalk interference from at least one of the one or more additional aggressor signals which are measured by the measurement instrument, and (5) the estimated crosstalk voltage interference from a sum of the noise component and the crosstalk interference from the one or more aggressor signals which are not received by the measurement instrument; and display on a display device the victim signal with the at least one of: (1) the ISI, (2) the ideal data pattern, (3) the estimated crosstalk interference from the at least one of the one or more aggressor signals which are not received by the measurement instrument, (4) the estimated crosstalk interference from the at least one of the one or more additional aggressor signals which are measured by the measurement instrument, and (5) the estimated crosstalk voltage interference from a sum of the noise component and the crosstalk interference from the one or more aggressor signals which are not received by the measurement instrument, removed.

In some versions of these embodiments, the signal processor is further configured to: in response to a user selection, remove from the victim signal at least one of: (1) the ISI, (2) the estimated crosstalk interference from at least one of the one or more additional aggressor signals which are measured by the measurement instrument, (3) the estimated crosstalk interference from at least one of the one or more aggressor signals which are not received by the measurement instrument, and (4) the estimated crosstalk interference from the one or more aggressor signals which are not received by the measurement instrument plus noise; and display on a display device an eye pattern for the victim signal with the at least one of: (1) the ISI, (2) the estimated crosstalk interference, (3) the estimated crosstalk interference from the at least one of the one or more aggressor signals which are not received by the measurement instrument, and (4) the estimated crosstalk interference from the one or more aggressor signals which are not received by the measurement instrument plus noise, removed.

In some versions of these embodiments, the signal processor is further configured to eliminate a skew between the captured samples of the victim signal and the captured samples of the additional aggressor signal before ascertaining the coefficients for the crosstalk interference filter function which transforms the received aggressor signal into the crosstalk signal, wherein the determined coefficients provide the crosstalk signal with a best-fit for the residual error signal.

In some versions of these embodiments, the signal processor is further configured to determine from the received victim signal and the ideal data pattern at least the ISI for the victim signal by ascertaining coefficients for an ISI filter function which transforms the ideal data pattern for the received victim signal into a hypothetical victim signal where the hypothetical victim signal includes the ISI but no crosstalk voltage interference thereto, wherein the ascertained coefficients provide the hypothetical victim signal with a best-fit for the received victim signal.

In some versions of these embodiments, the signal processor is further configured to ascertain the coefficients of the ISI filter function by: causing the victim signal to comprise a repeating data pattern such that the captured samples of the received victim signal include a plurality of instances of the data pattern; ascertaining, from the captured samples of the received victim signal for the plurality of instances of the data pattern, an average vector of captured data sample values over the plurality of instances of the data pattern for each of a plurality of bits in the data pattern; and ascertaining from the average vector and the bits in the data pattern the coefficients of the ISI filter function.

In some versions of these embodiments, the signal processor is further configured to ascertain the coefficients of the ISI filter function by solving a set of linear equations, wherein in each equation a data set of the captured samples of the victim signal is set equal to a convolution of the ISI filter function and the ideal data pattern for the captured samples of the received victim signal.

In some embodiments, the at least one victim signal includes at least one of a serial data signal and a supply voltage, wherein the ISI of the supply voltage is set equal to zero.

In some embodiments, the crosstalk interference to the victim signal includes at least one of linear crosstalk, nonlinear crosstalk, and jitter.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
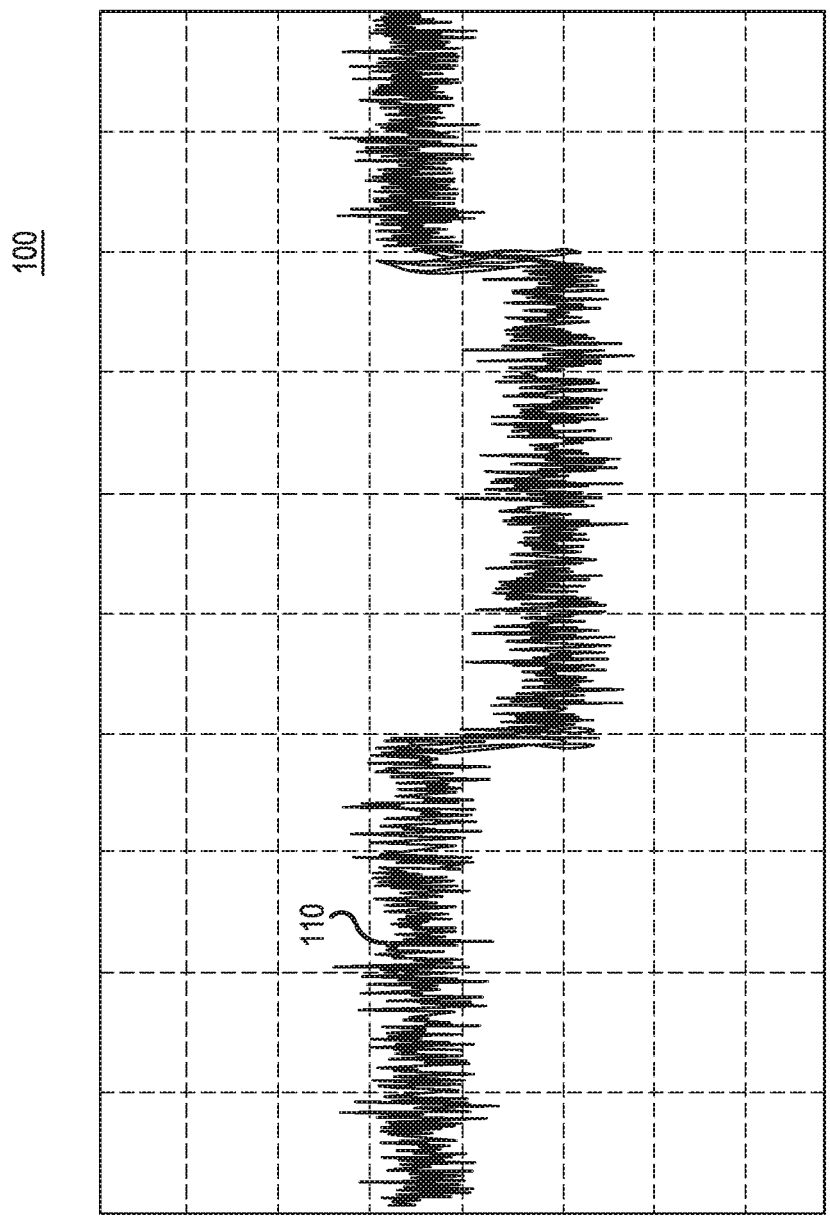
FIG. 1 illustrates a display of an example of a waveform of a victim signal for a device under test which may include an unknown combination of intersymbol interference (ISI), noise, and crosstalk from one or more aggressor signals.

FIG. 1 illustrates a display 100 of an example of a victim waveform 110 of a victim signal for a device under test (DUT) which may include an unknown combination of intersymbol interference (ISI), noise, and crosstalk from one or more aggressor signals. Simply looking at victim waveform 110, it is apparent that the signal includes some interference and/or noise, but it is not apparent what the source(s) of that interference and/or noise is, and therefore it is difficult to determine what might be done to improve the quality of the victim signal or its victim waveform 110.

Figure 2:
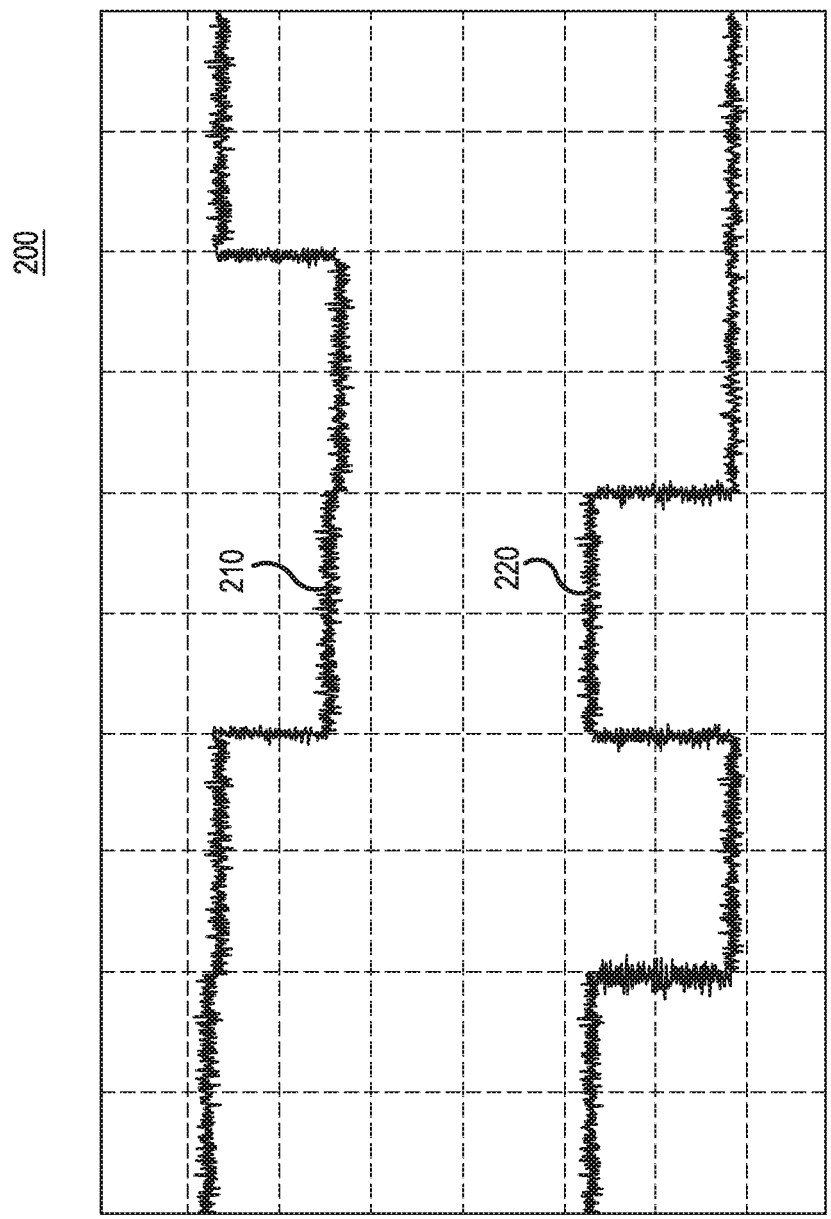
FIG. 2 illustrates a display of an example of a waveform of a victim signal for a device under test and aggressor signal which produces crosstalk interference to the victim signal.

FIG. 2 illustrates a display of an example of a victim waveform 210 of a victim signal for a DUT and an aggressor waveform 220 of an aggressor signal which may generate crosstalk interference to the victim signal which is represented by victim waveform 210. As shown in FIG. 2, there is noise and/or interference riding on aggressor waveform 220. There is also noise and/or interference riding on victim waveform 210. However simply looking at the two waveforms, it is not apparent to what extent noise and/or interference riding on victim waveform 210 is as a result of crosstalk interference from the signal represented by aggressor waveform 220.

As noted above, when both the aggressor signal and the victim signal can be probed and measured, then techniques such as those disclosed in the '786 Application and the '189 Application have been developed for analyzing and diagnosing crosstalk from the aggressor signal onto a victim signal.

However, in some cases the aggressor signal represented by aggressor waveform 220 may not be sampled or measured, perhaps because it is not convenient or possible to do so, for example in a case where the aggressor signal is internal to an IC or otherwise inaccessible for probing.

Embodiments of measurement instruments and methods disclosed herein may estimate the crosstalk interference to the victim signal which is represented by victim waveform 210 from an aggressor signal which is represented by aggressor waveform 220 even when the aggressor signal itself is not sampled or measured. Embodiments of measurement instruments and methods disclosed herein may estimate the ISI present in the victim signal which is represented by victim waveform 210. These embodiments may further estimate the crosstalk interference to the victim signal which is represented by victim waveform 210 from one or more additional aggressor signals which are probed and sampled. Some embodiments may also, remove from victim waveform 210 one or more of: (1) the ISI; (2) the ideal data pattern, (3) the estimated crosstalk interference to victim waveform 210 from unmeasured or unprobed aggressor signals plus noise; and (4) the estimated crosstalk interference to victim waveform 210 from one or more additional aggressor signals which have been sampled and measured. In some embodiments, the selections of what to remove from victim waveform 210 may be in response to a user selection. In some embodiments, a measurement instrument may display any combination of signal waveforms and/or eye patterns representing: (1) victim waveform 210; (2) an ideal victim waveform in the presence of no ISI, no crosstalk interference, and no noise; (3) a modified victim waveform 210 with one or more of the following removed: the ISI, the estimated crosstalk interference to victim waveform 210 from unmeasured or unprobed aggressor signals plus noise, and the estimated crosstalk interference to victim waveform 210 from one or more additional aggressor signals which have been sampled and measured.

Figure 3:
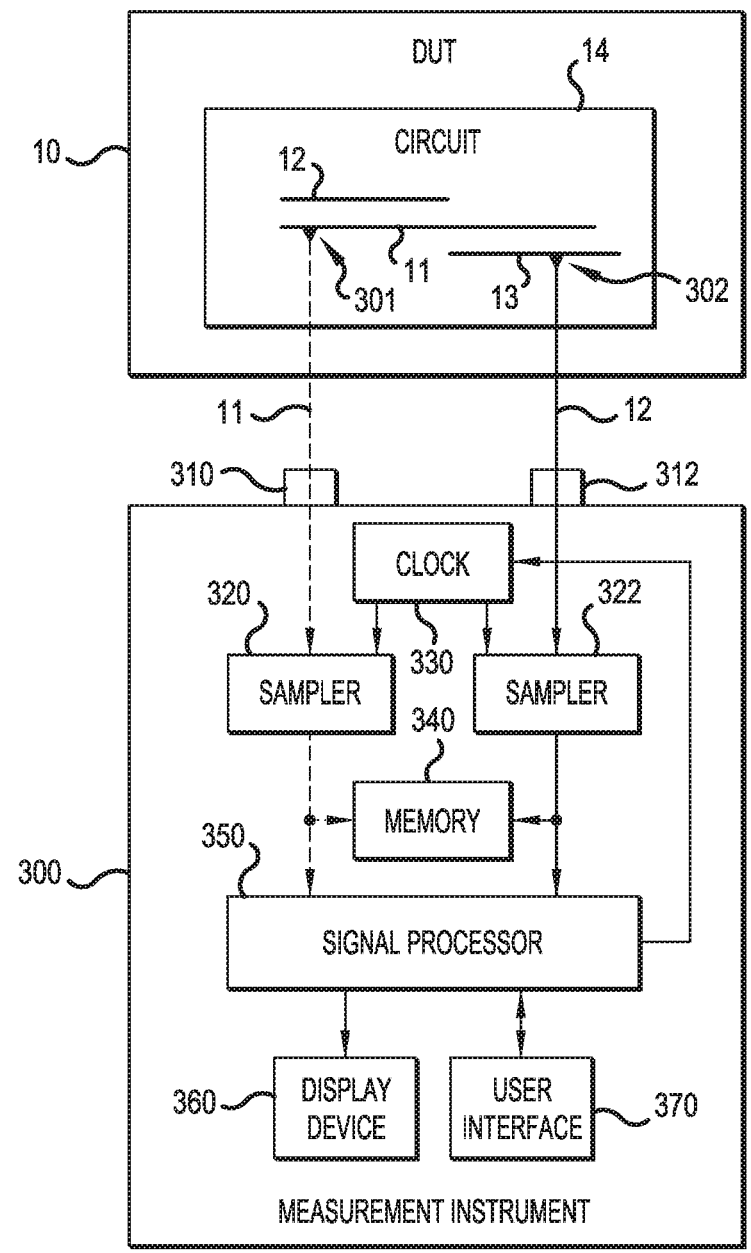
FIG. 3 is a simplified block diagram of an example embodiment of a measurement instrument which may analyze crosstalk interference to a victim signal of a device under test.

FIG. 3 is a simplified block diagram of an example embodiment of a measurement instrument 300 which may analyze crosstalk interference to a victim signal 11 of an example device under test (DUT) 10.

Here, example DUT 10 includes a circuit 14, for example a high speed digital communication circuit.

In DUT 10, a victim signal 11 of circuit 14 may experience crosstalk from an aggressor signal 12 and from an additional aggressor signal 13.

In some embodiments, measurement instrument 300 may be a digital oscilloscope.

Measurement instrument 300 may include: a first input 310 configured to receive (e.g., via a first probe 301) victim signal 11 from a DUT 10; a first sampler 320 configured to capture samples of victim signal 11; a second input 312 configured to receive (e.g., via a second probe 302) additional aggressor signal 13 from DUT 10; a second sampler 322 configured to capture samples of received additional aggressor signal 13; and a signal processor 350. For example, victim signal 11 may have a signal waveform like victim waveform 110 or victim waveform 210 discussed above, and aggressor signal 12 may have a waveform like aggressor waveform 220, but in this case that aggressor waveform 220 is unknown to measurement instrument 300.

In the example embodiment of FIG. 3, aggressor signal 12 is not probed, received, sampled, or measured by measurement instrument 300.

Although FIG. 3 illustrates an example with a single aggressor signal 12 which is not probed, received, sampled, or measured by measurement instrument 300, and a single additional aggressor signal 13 which is probed, received, sampled, and measured by measurement instrument 300, in general there may be two or more aggressor signals which are not probed, received, sampled, or measured by measurement instrument 300, and two or more additional aggressor signals which are probed, received, sampled, and measured by measurement instrument 300, in which case measurement instrument 300 may have more than two probes, inputs, samplers, etc.

In some embodiments, each of first sampler 320 and second sampler 322 may include an analog-to-digital converter (ADC) which may be clocked in response to a clock 330 of measurement instrument. In some embodiments, clock 330 may be recovered from the captured samples of received victim signal 11 by any of many clock recovery techniques known to those skilled in the art.

Measurement instrument 300 may include a display device 360 and a user interface 370. Display device 360 may include a liquid crystal display (LCD), a plasma display, a cathode ray tube (CRT), etc. User interface 370 may include one or more of: a keyboard, a keypad, control knobs, a mouse, a trackball, buttons, indicator lights, etc., and associated processor and software for implementing user interface 370.

Measurement instrument 300 may include memory 340 which may store therein digitized samples of victim signal 11 captured by first sampler 320 and digitized samples of additional aggressor signal 13 captured by second sampler 322. In that case, in some embodiments the digitized samples may be communicated by measurement instrument 300 under control of a controller or processor (not shown) via a communications interface (also not shown) to an external device such as a computer where the digitized samples may be processed as described below with respect to signal processor 350. The communication interface may be any suitable interface, for example conforming to standards such as Ethernet, specialized test instrument standards, etc. In some embodiments, the communication interface may allow measurement instrument to communicate commands and data with one or more external computers and/or other measurement instruments via the Internet.

Measurement instrument 300 may include other components and subsystems not illustrated in FIG. 3 so as not to obscure features of measurement instrument described herein for estimating a crosstalk voltage induced onto received victim signal 11 from aggressor signal 12 which is not received by measurement instrument 300.

Victim signal 11 may be decomposed into several components according to equation (1):

$$M=S+I+X+N, \qquad (1)$$

where M is the measured victim signal; S is the ideal binary signal (a binary signal composed of samples that are all either "high" or "low"), I is the ISI in the victim signal; X is the total crosstalk interference on the victim signal from all aggressor signals; and N is noise and modeling errors for modeling the received victim waveform as a function of the aggressor signals and ISI (hereinafter referred to as "the noise component").

If it is assumed that in a general case there are multiple aggressor signals, then X has components: $X=X_1+X_2+X_3$, where each component is from a different aggressor signal.

If we assume that one or more of the aggressor signals are not probed, received, sampled, or measured by measurement instrument 300, and one or more additional aggressor signals are probed, received, sampled, and measured by measurement instrument 300, then equation (1) may be rewritten as:

$$M=S+I+X_1+X_2+X_3+\ldots+U, \qquad (2)$$

where $U=X_U+N$, where $X_U$ is the crosstalk induced onto victim signal from one or more aggressor signals which are not probed, received, sampled, or measured by measurement instrument 300, and where $X_1, X_2, X_3, \ldots$ are crosstalk components induced onto victim signal 11 from additional aggressor signals which are probed, received, sampled, and measured by measurement instrument 300.

Thus, U, which is a residual component of the received victim signal 11 comprising the combined noise component and crosstalk interference on victim signal 11 from one or more aggressor signals which are not probed, received, sampled, or measured by measurement instrument 300, can be found from:

$$U=M-S-I-X_1-X_2-X_3 \qquad (3)$$

Here, in some embodiments, the intersymbol interference (I) and the crosstalk components $X_1, X_2, X_3, \ldots$ induced onto victim signal 11 from additional aggressor signals which are probed, received, sampled, and measured by measurement instrument 300 may be obtained by techniques taught in the '786 Application and the '189 Application.

Beneficially, signal processor 350 may perform a series of pre-processing operations, including edge detection in victim signal 11 and clock recovery from victim signal 11. Beneficially, measurement instrument 300 may have incorporated therein the ability to employ standard methods for performing these pre-processing operations, and any of these standard methods may be employed. For example, measurement instrument 300 may allow a user (e.g., via user interface 370) to specify voltage thresholds for defining the timing of an edge of bit transition 112. Measurement instrument 300 also may allow a user (e.g., via user interface 370) to specify one of many built-in clock recovery algorithms to be applied to victim signal 11 to recover clock 330. Beneficially, signal processor 350 may also perform a de-skewing pre-processing operation to eliminate or compensate for small time shifts or skew between victim signal 11 and any additional aggressor signal 13 which may be measured by measurement instrument 300 as part of an algorithm to determine the crosstalk component induced onto victim signal 11 from additional aggressor signal 13, as taught in the '786 Application and the '189 Application.

In some embodiments, the ISI for the victim signal may be determined or ascertained from the received victim signal and the ideal data pattern by determining or ascertaining coefficients for an ISI filter function which transforms the ideal data pattern for the received victim signal into a hypothetical victim signal, where the hypothetical victim signal includes the ISI but no crosstalk voltage induced thereon, and wherein the ascertained coefficients provide the hypothetical victim signal with a best-fit for the received victim signal.

In some embodiments, the coefficients of the ISI filter function may be determined or ascertained by: causing the victim signal to comprise a repeating data pattern (e.g., a pseudo-random bitstream (PRBS)) such that the captured samples of the received victim signal include a plurality of instances of the data pattern; finding from the captured samples of the received victim signal for the plurality of instances of the data pattern, an average vector of captured data sample values over the plurality of instances of the data pattern for each bit transition in the data pattern; and ascertaining the coefficients of the ISI filter function from the average vector and the bit transitions in the repeating data pattern.

In some embodiments, the coefficients of the ISI filter function may be ascertained by solving a set of linear equations wherein in each equation a data set of the captured samples of the victim signal is set equal to a convolution of the ISI filter function and the captured samples of the received victim signal.

In some cases, measurement instrument 300 may not measure any of the aggressor signals in circuit 14, for example when a user is only interested in seeing what the total crosstalk looks like, in which case all aggressor signals will contribute to U, in which case equation (3) becomes equation (4):

$$U = M - S - I \quad (4)$$

In other cases, measurement instrument 300 may measure the crosstalk from as many of the aggressor signals in circuit 14 as possible to remove their contribution to U. Again, examples of such procedures are described in detail in the '786 Application and the '189 Application.

Beneficially, given the decomposition of equation (3) and the ability of measurement instrument 300 to accurately estimate the various crosstalk components I, $X_1$, $X_2$, $X_3$, U, etc., then measurement instrument 300 may allow a user via user interface 370 to select any combination of these components and remove them from the victim waveform for the victim signal 11 and display the result to the user via display device 360.

In particular, measurement instrument 300 may automatically, or under user control, remove the ISI component I and the crosstalk components $X_1$, $X_2$, $X_3$, . . . induced onto victim signal 11 from additional aggressor signals which are probed, received, sampled, and measured by measurement instrument 300 leaving only the crosstalk component U which is a sum of the noise component and the crosstalk interference to received victim signal 11 from one or more aggressor signals which are not received or measured by measurement instrument 300. Measurement instrument may then display the victim waveform for received victim signal 11 both with, and without, the crosstalk component U, with all other crosstalk and ISI components removed, so that the effect of the crosstalk component U on victim signal 11 may be apparent to the user.

Beneficially, measurement instrument 300 may construct a user-requested waveform differently, depending on whether or not the user requests to remove the crosstalk component U from the waveform for the received victim signal 11.

In particular, when a user wants to remove one or more components such as I, X1, etc., then measurement instrument 300 may construct the desired waveform by subtracting the selected components from the measured signal, M. In contrast, when the user want to remove one or more components including U, then measurement instrument 300 may construct the desired waveform by adding together all of the remaining components which are not being removed.

Measurement instrument 300 may perform crosstalk analysis on received victim signal 11 for some or all of the following scenarios: (1) transmission line crosstalk between serial data signals; (2) voltage dependent crosstalk induced onto a victim signal from one or more aggressor supply voltages of the DUT; (3) jitter in a serial data victim signal from one or more supply voltage aggressors; and (4) crosstalk interference onto a victim supply voltage from one or more aggressor serial data signals.

In the first case (1) second case (2), and third case (3), the victim is a serial data waveform so the ideal waveform is a binary waveform which represents the data pattern (0s and 1s) of the victim signal with edges that are spaced at exact multiples of the clock period of clock 330 (an integer number of samples wide). The ISI is defined by distortion to the victim signal which is correlated to data pattern of the victim signal, for example due to reflections or finite bandwidth in the channel in which the signal propagates.

In the fourth case (4), the victim is a supply voltage so the ideal waveform is just the mean value of the victim supply voltage. Furthermore, it should be noted that ISI is not defined for a victim supply voltage, because ISI is distortion which is correlated to a data pattern, and the supply voltage has no data pattern. In this case we can define I=0 (i.e., ISI for a supply voltage is zero), and we do not need to use any of the disclosed methods for computing the ideal data pattern or the ISI. And so in this case the residual signal is just equal to the received victim signal.

In some embodiments, signal processor 250 may process the residual component U to separate an estimated crosstalk interference $X_U$ induced onto victim signal 11 from one or more aggressor signals which are not probed, received, sampled, or measured by measurement instrument 300, from noise N. In some embodiments, this may include: performing a Fourier transform on the residual component U of received victim signal 11 to produce a frequency spectrum comprising a plurality of frequency components of the residual component U of received victim signal 11; setting a threshold; eliminating from the frequency spectrum any frequency components of the residual component U of received victim signal 11 having a magnitude less than the threshold, to produce a modified frequency spectrum; and performing an inverse Fourier transform on the modified frequency spectrum to produce an estimate of the crosstalk interference $X_U$ from the one or more aggressor signals which are not received by measurement instrument 300.

Summarizing an example of some of the procedures described above, an example embodiment of a method of analyzing crosstalk from an aggressor signal to a victim signal will now be described.

Figure 4:
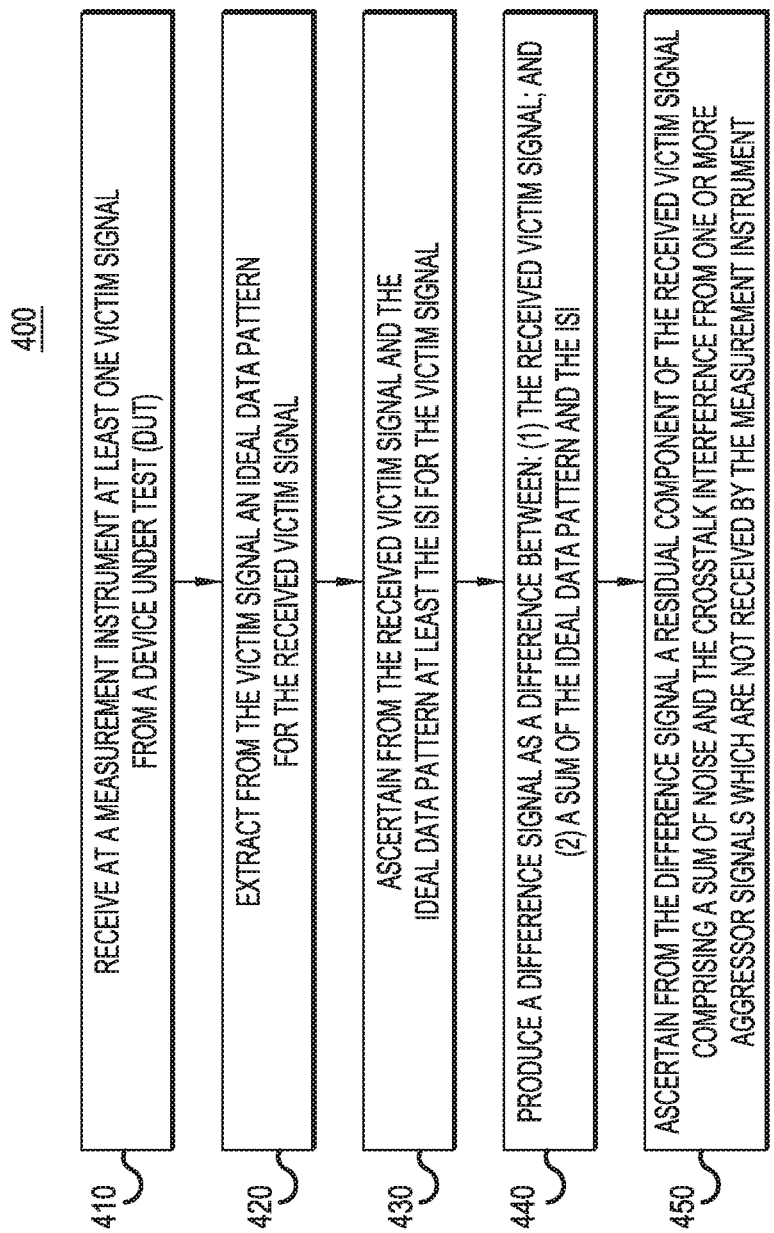
FIG. 4 is a flowchart of an example embodiment of a method 500 of analyzing crosstalk interference to a victim signal of a device under test from one or more unmeasured aggressor signals.

FIG. 4 is a flowchart of an example embodiment of a method 400 of analyzing crosstalk interference to a victim signal of a device under test from one or more unmeasured aggressor signals.

In an operation 410, a measurement instrument (e.g., measurement instrument 300) receives at one or more inputs thereof at least one victim signal from a device under test (DUT).

An operation 420 includes extracting from the received victim signal an ideal data pattern for the received victim signal, where the ideal data pattern does not include ISI and does not include crosstalk interference from aggressor signals. Those skilled in the art will know algorithms by which the ideal data pattern for the victim signal can be determined from the received victim signal and clock 330 recovered from the received victim signal and/or from an "explicit" clock for the received victim signal which may be provided to the measurement instrument from an external source.

An operation 430 includes ascertaining from the received victim signal and the ideal data pattern at least the ISI of the victim signal. In cases where there are one or more additional aggressor signals which are received by the measurement instrument, then operation 430 may further include ascertaining the crosstalk interference to the victim signal from the one or more additional aggressor signals which are received by the measurement instrument.

An operation 440 includes producing a difference signal as a difference between: (1) the received victim signal; and (2) a sum of the ideal data pattern and the ISI. In cases where there are one or more additional aggressor signals which are received by the measurement instrument, then operation 430 may further include removing from the difference signal the ascertained crosstalk interference to the victim signal from the one or more additional aggressor signals which are received by the measurement instrument.

An operation 450 includes ascertaining from the difference signal a residual component of the received victim signal comprising a sum of a noise component and the crosstalk interference from one or more aggressor signals which are not received by the measurement instrument.

Additional operations are possible, as discussed above, and as discussed below with respect to FIGS. 8A and 8B. For example, where the victim signal further includes crosstalk interference from one or more additional aggressor signals which are received by the measurement instrument, the method may further include: ascertaining the crosstalk interference to the victim signal from the one or more additional aggressor signals which are received by the measurement instrument; and subtracting from the difference signal the ascertained crosstalk interference to the victim signal from the one or more additional aggressor signals which are received by the measurement instrument to ascertain the residual component of the received victim signal.

In some embodiments, the victim signal(s) may include one or more serial data signals and/or one or more supply voltages.

The techniques described above can be applied to analysis of linear crosstalk, non-linear crosstalk, and jitter in which is imposed on a victim signal due to any combination of ISI, crosstalk from one or more aggressor signals which are not received and measured by a measurement instrument, and/or crosstalk from one or more additional aggressor signals which are received and measured by a measurement instrument.

In the case of jitter, time interval error (TIE) data for a victim signal, as described in the '786 Application, could be decomposed into an ISI component, one or more crosstalk components from one or more aggressor signals which are received and measured by a measurement instrument, and a component due to noise and from one or more aggressor signals which are not received and measured by a measurement instrument.

Figure 5:
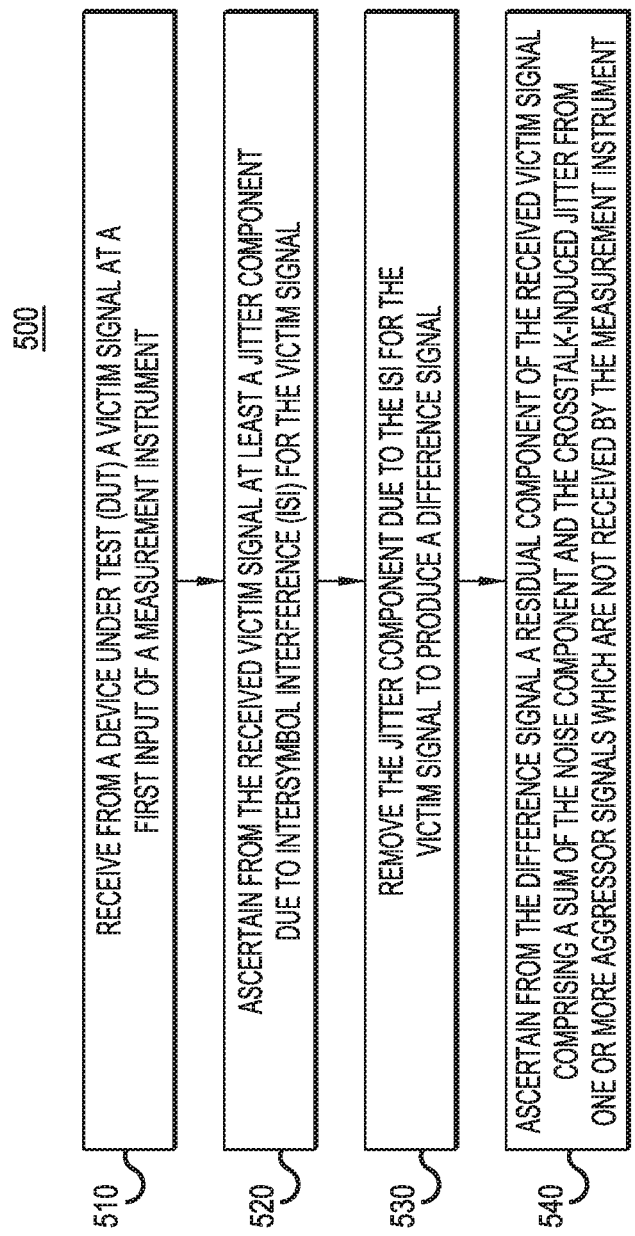
FIG. 5 is a flowchart of an example embodiment of a method 500 of analyzing jitter induced onto a victim signal of a device under test from one or more unmeasured aggressor signals.

FIG. 5 is a flowchart of an example embodiment of a method 500 of analyzing jitter induced onto a victim signal of a device under test from one or more unmeasured aggressor signals.

In an operation 510, a measurement instrument (e.g., measurement instrument 300) receives at least one victim signal from a device under test (DUT).

An operation 520 includes ascertaining from the received victim signal at least a jitter component due to inter-symbol interference (ISI) for the victim signal. In cases where there are one or more additional aggressor signals which are received by the measurement instrument, then operation 530 may further include ascertaining ascertained jitter in the victim signal from crosstalk interference by one or more additional aggressor signals which are received by the measurement instrument.

An operation 530 includes removing the jitter component due to ISI from the received victim signal to produce a difference signal. In cases where there are one or more additional aggressor signals which are received by the measurement instrument, then operation 530 may further include removing from the difference signal the ascertained jitter in the victim signal from crosstalk interference by one or more additional aggressor signals which are received by the measurement instrument.

An operation 540 includes ascertaining from the difference signal a residual component of the received victim signal comprising a sum of the noise component and the crosstalk-induced jitter from one or more aggressor signals which are not received by the measurement instrument.

Additional operations are possible, as discussed above, and as discussed below with respect to FIGS. 8A and 8B.

Figure 6:
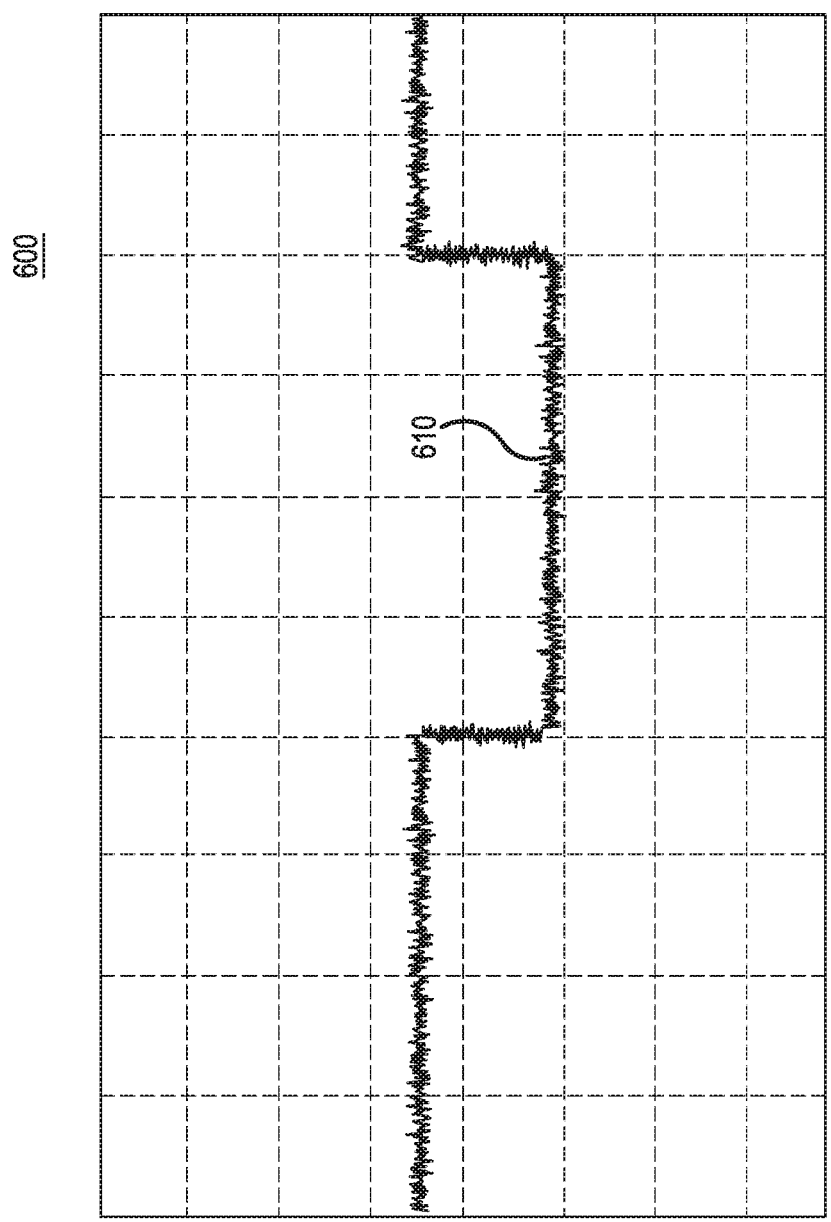
FIG. 6 illustrates a display of an example of the signal waveform of FIG. 1 where ISI and/or crosstalk interference and/or noise have been removed from the victim waveform.

FIG. 6 illustrates a display 600 of an example of a signal waveform 610 which corresponds to victim waveform 110 of FIG. 1, with ISI and/or crosstalk interference and/or noise removed from victim waveform 110. In this example, it is seen that signal waveform 610 still includes noise and/or interference, but the level is reduced compared to victim waveform 110 of FIG. 1.

Figure 7:
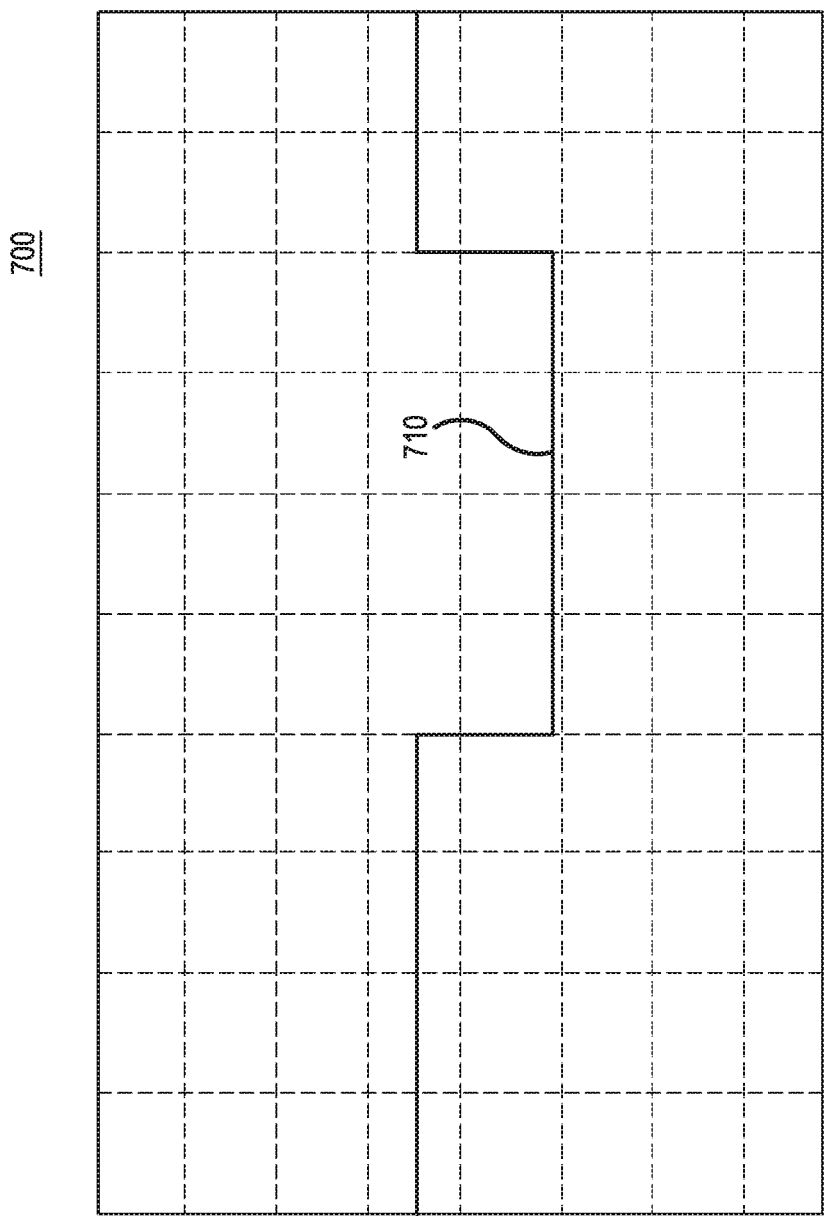
FIG. 7 illustrates a display of another example of the signal waveform and the supply voltage waveform of FIG. 1 where all ISI, crosstalk interference, and noise have been removed from the victim waveform.

FIG. 7 illustrates a display of another example of a signal waveform 710 which corresponds to victim waveform 110 of FIG. 1, with the voltage-dependent power supply crosstalk removed as described above. In this example, it is seen that essentially all of the noise and/or interference has been removed from signal waveform 710.

In some embodiments, measurement instrument 200 may also display via display device 460 a so-called "eye pattern" of received victim signal 11, as is known by those skilled in the art. In general, the eye pattern may reflect the ideal waveform of victim signal 11 with various error components impressed thereon, including: (1) ISI; (2) crosstalk interference. Here, however, measurement instrument 300 may allow a user to select, for example from a menu provided to the user via user interface 470, one or more of these error components to be calculated by measurement instrument 300 and removed from received victim signal 11, and the eye pattern may be displayed by display device 460 with the selected error component(s) removed. For example, this may assist a user in ascertaining which components are contributing the greatest interference to "closing the eye" of the eye pattern for victim signal 11.

Figure 8A:
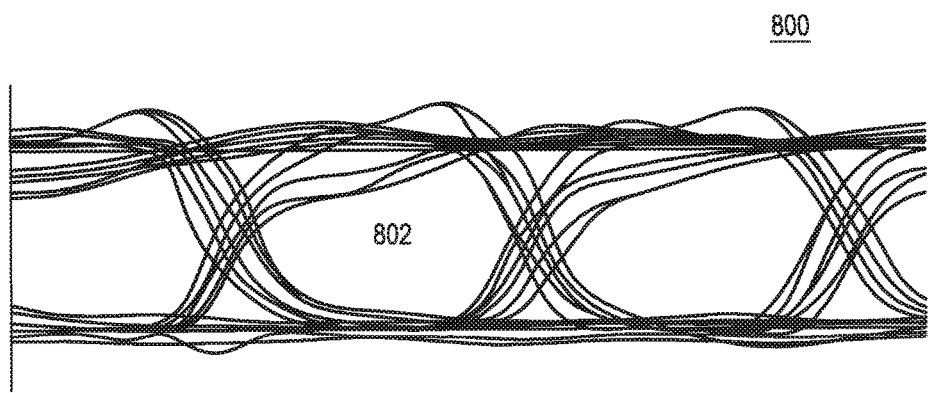
FIG. 8A illustrates a display of an example of an eye pattern of a victim signal of a DUT with an unknown combination of intersymbol interference (ISI), noise, and crosstalk from one or more aggressor signals.

FIG. 8A illustrates a display of an example of an eye pattern 800 of a victim signal of a DUT with an unknown combination of intersymbol interference (ISI), noise, and crosstalk from one or more aggressor signals. Eye pattern 800 has an opening 802.

Figure 8B:
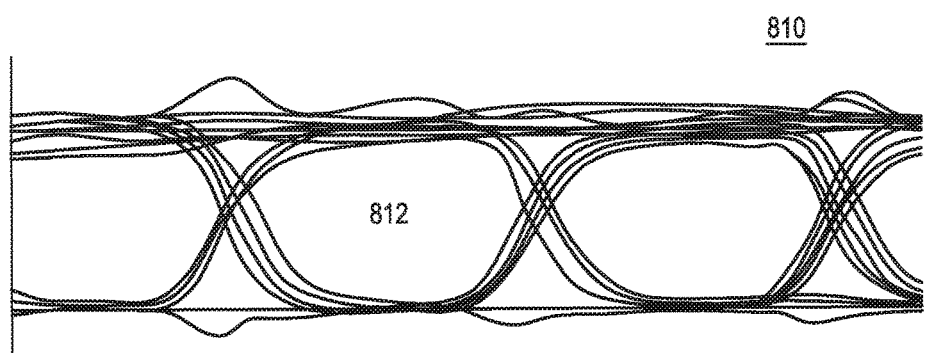
FIG. 8B illustrates a display of an example of an eye pattern of the victim signal of FIG. 7 where ISI and/or crosstalk interference and/or noise have been removed from the victim waveform.

FIG. 8B illustrates a display of an example of an eye pattern 810 where ISI and/or crosstalk interference and/or noise have been removed from the victim waveform. Here it is seen that eye pattern 810 has an opening 812 which is greater than opening 802, due to the elimination of one or more sources of noise and/or interference from the victim signal.

While example embodiments are disclosed herein, one of ordinary skill in the art appreciates that many variations that are in accordance with the present teachings are possible and remain within the scope of the appended claims. For example, in some cases a measurement instrument may receive and process more than one aggressor signal (e.g., more than one supply voltage) and/or more than one victim signal. In that case, the procedures described herein can be performed with respect to each combination of a particular supply voltage and a particular victim signal to estimate the crosstalk voltage which is induced onto the particular victim signal from the particular supply voltage. As another example, in addition to displaying the victim waveform with one or more interference components removed, those same interference components, ISI for example, may be displayed directly. The invention therefore is not to be restricted except within the scope of the appended claims.

The invention claimed is:

1. A method, comprising:
   a measurement instrument receiving at one or more inputs thereof at least one victim signal from a device under test (DUT), the victim signal including crosstalk interference from one or more aggressor signals which are not received by the measurement instrument;
   extracting from the victim signal an ideal data pattern for the received victim signal, where the ideal data pattern does not include inter-symbol interference (ISI), does not include noise, and does not include crosstalk interference to the victim signal;
   ascertaining from the received victim signal and the ideal data pattern at least the ISI for the victim signal;
   producing a difference signal as a difference between: (1) the received victim signal; and (2) a sum of the ideal data pattern and the ISI; and
   ascertaining from the difference signal a residual component of the received victim signal comprising a sum of a noise component and the crosstalk interference from one or more aggressor signals which are not received by the measurement instrument.

2. The method of claim 1, wherein the victim signal further includes crosstalk interference from one or more additional aggressor signals which are received by the measurement instrument, the method further including:
   ascertaining the crosstalk interference to the victim signal from the one or more additional aggressor signals which are received by the measurement instrument; and
   subtracting from the difference signal the ascertained crosstalk interference to the victim signal from the one or more additional aggressor signals which are received by the measurement instrument to ascertain the residual component of the received victim signal.

3. The method of claim 1, further comprising estimating the crosstalk interference from the one or more aggressor signals which are not received by the measurement instrument, from the residual component of the received victim signal.

4. The method of claim 3, wherein estimating the crosstalk interference from the one or more aggressor signals which are not received by the measurement instrument, from the residual component of the received victim signal, comprises:
   performing a Fourier transform on the residual component of the received victim signal to produce a frequency spectrum comprising a plurality of frequency components of the residual component of the received victim signal;
   setting a threshold;
   eliminating from the frequency spectrum any frequency components of the residual component of the received victim signal having a magnitude less than the threshold, to produce a modified frequency spectrum; and
   performing an inverse Fourier transform on the modified frequency spectrum to produce an estimate of the crosstalk interference from the one or more aggressor signals which are not received by the measurement instrument.

5. The method of claim 4, further comprising:
   in response to a user selection, removing from the victim signal at least one of: (1) the ISI, (2) the estimated crosstalk interference to the victim signal from the one or more aggressor signals which are not received by the measurement instrument, and (3) the estimated crosstalk interference to the victim signal from at least one of the one or more additional aggressor signals; and
   displaying on a display device at least one of:
      the victim signal with the at least one of: (1) the ISI, (2) the estimated crosstalk interference to the victim signal from the one or more aggressor signals which are not received by the measurement instrument, and (3) the estimated crosstalk interference to the victim signal from at least one of the one or more additional aggressor signals, removed; and
      an eye pattern for the victim signal with the at least one of: (1) the ISI, (2) the estimated crosstalk interference to the victim signal from the one or more aggressor signals which are not received by the measurement instrument, and (3) the estimated crosstalk interference to the victim signal from at least one of the one or more additional aggressor signals, removed.

6. The method of claim 1, wherein ascertaining from the received victim signal and the ideal data pattern at least the ISI for the victim signal comprises ascertaining coefficients for an ISI filter function which transforms the ideal data pattern for the received victim signal into a hypothetical victim signal where the hypothetical victim signal includes the ISI but no crosstalk interference thereto, wherein the ascertained coefficients provide the hypothetical victim signal with a best-fit for the received victim signal.

7. The method of claim 6, further comprising capturing samples of the received victim signal, wherein ascertaining the coefficients of the ISI filter function includes:
   causing the victim signal to comprise a repeating data pattern such that the captured samples of the received victim signal include a plurality of instances of the data pattern;
   ascertaining, from the captured samples of the received victim signal for the plurality of instances of the data pattern, an average vector of captured data sample values over the plurality of instances of the data pattern for each of a plurality of bits in the data pattern; and
   ascertaining from the average vector and the bits in the data pattern the coefficients of the ISI filter function.

8. The method of claim 6, wherein ascertaining the coefficients of the ISI filter function includes solving a set of linear equations wherein in each equation a data set of the captured samples of the victim signal is set equal to a convolution of the ISI filter function and the ideal data pattern for the captured samples of the received victim signal.

9. The method of claim 1, wherein the at least one victim signal includes at least one of a serial data signal and a supply voltage.

10. The method of claim 1, wherein the crosstalk interference to the victim signal includes at least one of linear crosstalk, non-linear crosstalk, and jitter.

11. A measurement instrument, comprising:
   one or more inputs configured to receive one or more victim signals from a device under test (DUT), the victim signal including crosstalk interference from one or more aggressor signals which are not received by the measurement instrument;
   a first sampler configured to capture samples of the received victim signal; and
   a signal processor configured to:
      extract from the victim signal an ideal data pattern for the received victim signal, where the ideal data pattern does not include intersymbol interference (ISI), does not include a noise component, and does not include crosstalk interference to the victim signal;
      ascertain from the received victim signal and the ideal data pattern at least the ISI for the victim signal;
      produce a difference signal as a difference between: (1) the received victim signal; and (2) a sum of the ideal data pattern and the ISI; and
      ascertain from the difference signal a residual component of the received victim signal comprising a sum of the noise component and the crosstalk interference from one or more aggressor signals which are not received by the measurement instrument.

12. The measurement instrument of claim 11, wherein the victim signal further includes crosstalk interference from one or more additional aggressor signals which are received by the measurement instrument, and wherein the signal processor is further configured to:
   ascertain the crosstalk interference to the victim signal from the one or more additional aggressor signals which are received by the measurement instrument; and
   subtract from the difference signal the ascertained crosstalk interference to the victim signal from the one or more additional aggressor signals which are received by the measurement instrument to ascertain the residual component of the received victim signal.

13. The measurement instrument of claim 12, wherein the signal processor is further configured to estimate the crosstalk interference from the one or more aggressor signals which are not received by the measurement instrument from the residual component of the received victim signal.

14. The measurement instrument of claim 12, wherein the signal processor is further configured to estimate the crosstalk interference from the one or more aggressor signals which are not received by the measurement instrument, from the residual component of the received victim signal, by:
   performing a Fourier transform on the residual component of the received victim signal to produce a frequency spectrum comprising a plurality of frequency components of the residual component of the received victim signal;
   setting a threshold;
   eliminating from the frequency spectrum any frequency components of the residual component of the received victim signal having a magnitude less than the threshold, to produce a modified frequency spectrum; and
   performing an inverse Fourier transform on the modified frequency spectrum to produce an estimate of the crosstalk interference from the one or more aggressor signals which are not received by the measurement instrument.

15. The measurement instrument of claim 14, wherein the signal processor is further configured to:
   in response to a user selection, remove from the victim signal at least one of: (1) the ISI, (2) the estimated crosstalk interference from the one or more aggressor signals which are not received by the measurement instrument, and (3) the estimated crosstalk interference to the victim signal from at least one of the one or more additional aggressor signals; and
   display on a display device at least one of:
      the victim signal with the at least one of: (1) the ISI, (2) the estimated crosstalk interference to the victim signal from the one or more aggressor signals which are not received by the measurement instrument, and (3) the estimated crosstalk interference to the victim signal from at least one of the one or more additional aggressor signals, removed, and
      an eye pattern for the victim signal with the at least one of: (1) the ISI, (2) the estimated crosstalk interference to the victim signal from the one or more aggressor signals which are not received by the measurement instrument, and (3) the estimated crosstalk interference to the victim signal from at least one of the one or more additional aggressor signals, removed.

16. The measurement instrument of claim 11, wherein the signal processor is further configured to ascertain from the received victim signal and the ideal data pattern at least the ISI for the victim signal by ascertaining coefficients for an ISI filter function which transforms the ideal data pattern for the received victim signal into a hypothetical victim signal where the hypothetical victim signal includes the ISI but no crosstalk interference thereto, wherein the ascertained coefficients provide the hypothetical victim signal with a best-fit for the received victim signal.

17. The measurement instrument of claim 16, wherein the signal processor is further configured to ascertain the coefficients of the ISI filter function by:

causing the victim signal to comprise a repeating data pattern such that the captured samples of the received victim signal include a plurality of instances of the data pattern;

ascertaining, from the captured samples of the received victim signal for the plurality of instances of the data pattern, an average vector of captured data sample values over the plurality of instances of the data pattern for each of a plurality of bits in the data pattern; and ascertaining from the average vector and the bits in the data pattern the coefficients of the ISI filter function.

18. The measurement instrument of claim 16, wherein the signal processor is further configured to ascertain the coefficients of the ISI filter function by solving a set of linear equations, wherein in each equation a data set of the captured samples of the victim signal is set equal to a convolution of the ISI filter function and the ideal data pattern for the captured samples of the received victim signal.

19. The measurement instrument of claim 11, wherein the at least one victim signal includes one of a serial data signal and a supply voltage, wherein the ISI of the supply voltage is zero.

20. The measurement instrument of claim 11, wherein the crosstalk interference to the victim signal includes at least one of linear crosstalk, non-linear crosstalk, and jitter.

* * * * *